United States Patent [19]
Baer

[11] Patent Number: 5,117,690
[45] Date of Patent: Jun. 2, 1992

[54] WIND SPEED AND WIND DIRECTION INDICATOR

[75] Inventor: John S. Baer, Bar Harbor, Me.

[73] Assignee: RainWise, Inc., Bar Harbor, Me.

[21] Appl. No.: 575,062

[22] Filed: Aug. 30, 1990

[51] Int. Cl.$^5$ .............................................. G01W 1/02
[52] U.S. Cl. ...................................................... 73/189
[58] Field of Search .................................. 73/188, 189

[56]  References Cited

U.S. PATENT DOCUMENTS

| | | | |
|---|---|---|---|
| 910,035 | 1/1809 | Winder | 73/189 |
| 1,344,315 | 6/1920 | Post | 73/189 |
| 2,040,305 | 5/1936 | Graham | . |
| 2,935,872 | 5/1960 | Misner | 73/189 |
| 3,871,220 | 3/1975 | Hillman | . |
| 4,152,933 | 5/1979 | Woodhouse | 73/189 |

*Primary Examiner*—Reinhard J. Eisenzopf
*Assistant Examiner*—E. Shopbell
*Attorney, Agent, or Firm*—Daniel H. Kane

[57]  ABSTRACT

A wind speed and wind direction indicator is constructed on a center support pole or mast having a vertical scale of wind speed indicia for visually reading wind speed at a distance from the pole. A swivel head is mounted at the top of the pole for rotation to different compass directions. A rigid arm pendulum is pivotally coupled to the swivel head for pivotal motion of the pendulum to different angles with respect to the support pole. A wind drag structure such as a wind sock is coupled to the free end of the rigid arm pendulum for angular positioning in response to varying wind speed. A sliding collar is mounted on the support pole for sliding motion up and down over the scale of wind speed indicia. A line is coupled between the free end of the rigid arm and the sliding collar for sliding motion of the collar over the scale of wind speed indicia in response to varying wind speed. A generally cylindrical compass direction sleeve is mounted on the support pole in relation to the swivel head and rigid arm pendulum. It is formed with wind direction compass indicia around the support pole for visual reading at a distance from the pole. The compass sleeve may be secured to the swivel head for rotation with the swivel head for indicating compass direction of origin of wind from a selected vantage point.

14 Claims, 2 Drawing Sheets

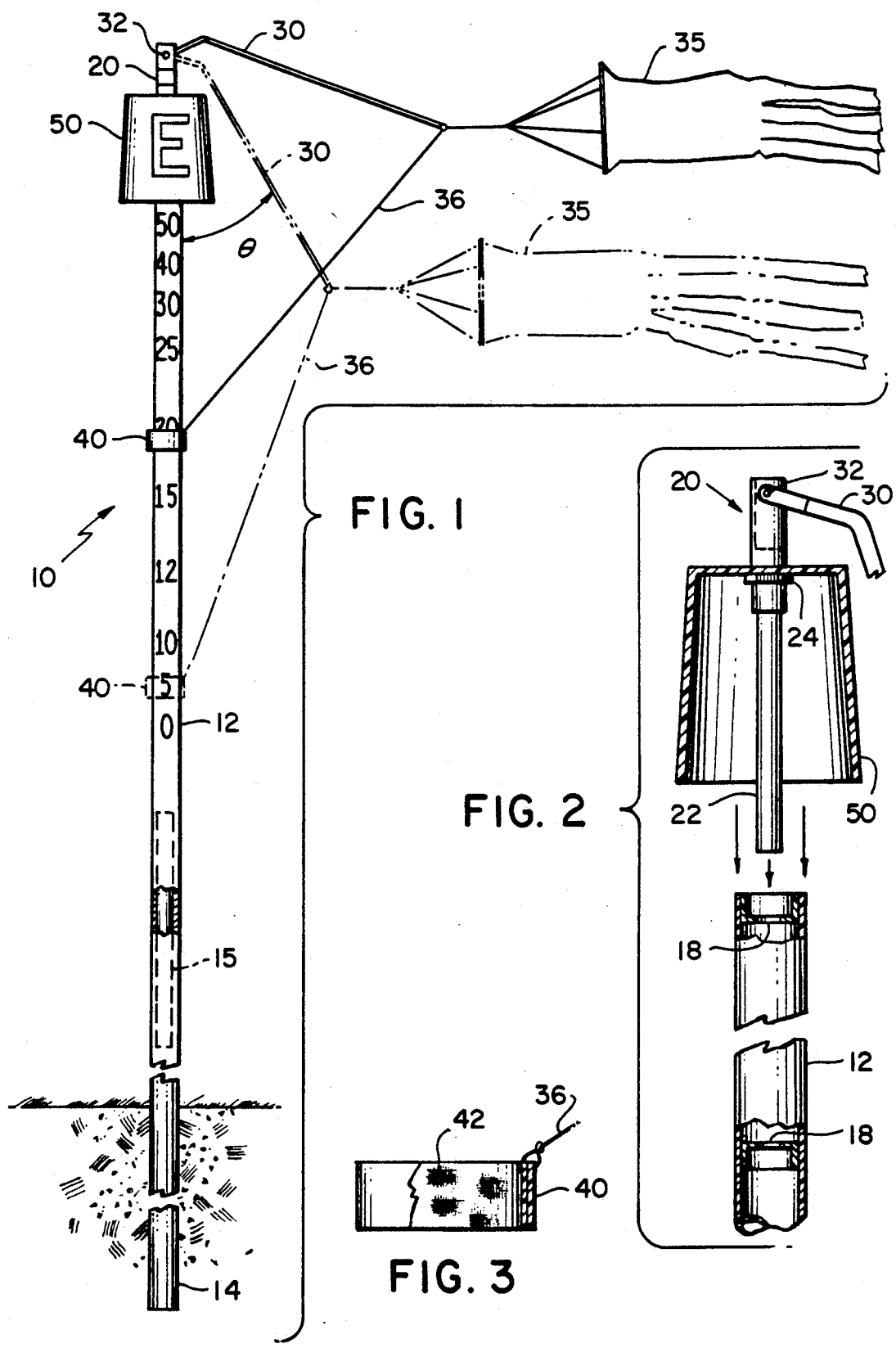

WIND SPEED AND WIND DIRECTION INDICATOR

TECHNICAL FIELD

This invention relates to a new wind speed and wind direction indicator which provides convenient visual reading of wind speed and wind direction information at a distance from the device.

BACKGROUND ART

The 1909 Winder U.S. Pat. No. 910,035 and the Misner U.S. Pat. No. 2,935,872 describe angle scale type wind speed indicators using what is effectively a wind drag pendulum or angle plate that provides a wind speed reading on an angle reading scale. A difficulty with the angle reading scale wind speed indicators is that they are difficult to read and do not afford convenient visual reading at a distance from the wind speed indicating device.

The Graham U.S. Pat. No. 2,040,305 differs from the angle scale type wind speed indicators in providing a linear reading scale. The wind drag pendulum, paddle or angle plate is rigidly coupled to a pivoting quadrant which in turn is connected to a vertical cable. The cable converts the rotary motion into linear motion. The cable is connected to a pointer which rides up and down in a slotted gauge to provide a linear scale reading.

The Post U.S. Pat. No. 1,344,315 similarly provides a wind speed reading by a pointer that slides up and down in a slotted gauge scale. In this patent, however, the pointer is coupled by a wire to a spring loaded wind drag plate that extends and retracts the wire in response to wind speed. Disadvantages of these linear scale wind speed indicators are the relative complexity of the mechanisms for converting the rotary motion of an angle plate anemometer to linear motion and the difficulty of reading wind speed from the pointer indicating linear scale at a distance from the devices.

The Hillman U.S. Pat. No. 3,871,220 is of interest because it describes a wind velocity and direction apparatus having a movable collar that can translate with limited motion on a mast in response to variable wind speed. The collar also rotates on the mast in response to changing wind direction. The collar is coupled to a fabric body wind sail "vane" that fills in response to the wind and is also able to rotate around the mast. The vertical displacement of the movable collar however is very limited and is solely for the purpose of moving an electrical coil relative to a ferrite core. This changes the reactance in an AC circuit and the variable AC signal from the AC circuit provides a direct measure of wind speed. The Hillman apparatus is therefore a limited motion transducer and in particular a "variable reactance" transducer wind speed indicator. The Hillman apparatus requires a complex mechanism and cannot provide direct visual reading of wind speed information at a distance from the device except through the use of the electrical signals.

OBJECTS OF THE INVENTION

It is therefore an object of the present invention to provide a new wind speed and wind direction indicator which affords direct and convenient visual reading of wind speed and wind direction information from a selected vantage point at a distance from the indicator.

Another object of the invention is to provide a wind speed indicator with a simplified mechanism for converting the rotary motion of a rigid arm pendulum, paddle, or angle plate to linear motion on an easily readable wind speed scale.

A further object of the invention is to use a mechanically variable vector or force triangle, and elements of Hooke's Law with gravity as the restoring force, for resolving angular motion of a pendulum arm in response to wind speed into linear motion of an indicator on an easily readable vertical scale.

DISCLOSURE OF THE INVENTION

In order to accomplish these results the invention provides a wind speed and wind direction indicator formed on a center support pole or mast having a vertical scale of wind speed indicia for visually reading wind speed at a distance from the pole. A swivel head is mounted at the top of the pole for rotation of the swivel head to different compass directions.

According to the invention a rigid arm is pivotally coupled at one end to the swivel head. The other end of the rigid arm is a free end for pivotal motion of the rigid arm to different angles with respect to the center pole. The rigid arm can therefore function as a pendulum suspended from the swivel head with gravity providing the restoring force. A wind drag structure is coupled to the free end of the rigid arm pendulum for angular motion extending and retracting the rigid arm in response to varying wind speed. Thus, different wind speeds change the angle of the rigid arm relative to the center pole. At the same time the rigid arm can rotate with the swivel head to different compass directions in response to varying wind direction.

The invention provides a slidably variable force triangle or vector triangle for resolving angular motion of the pendulum to linear motion of an indicator on the support pole or mast. To this end a sliding collar is mounted on the center support pole for sliding motion up and down over the scale of wind speed indicia for indicating wind speed. A line is coupled between the free end of the rigid arm pendulum and the sliding collar for sliding motion of the collar over the scale in response to varying wind speed. The collar also rotates around the support pole with the swivel head in response to changing wind direction.

In order to provide easily readable wind direction information at the same time, a compass direction sleeve is mounted on the support pole in relation to the swivel head and rigid arm pendulum. The compass sleeve is formed with wind direction compass indicia 360° around the support pole for visual reading at a distance from the pole.

In the preferred example embodiment, the compass sleeve is secured to the swivel head for rotation with the rigid arm pendulum. The wind direction compass indicia on the compass sleeve, for example NESW, are set with respect to the rigid arm pendulum so that the wind direction compass indicium indicating the true compass direction of origin of the wind is visible and readable from a selected vantage point.

In an alternative embodiment, the compass sleeve is secured to the support mast in stationary position. The wind direction compass indicia on the compass sleeve substantially coincide with true compass directions. A wind direction pointer is mounted on the swivel head extending from the swivel head on the side opposite from the rigid arm pendulum. The pointer therefore points at the wind direction compass indicium indicating the true compass direction of origin of the wind.

The compass sleeve is preferably a generally cylindrical surface coaxial with the center support pole. The compass direction cylinder is secured to the swivel head for rotation or is mounted in fixed position on the support pole below the swivel head according to the alternative embodiments.

According to the preferred embodiment, the wind drag structure connected to the free end of the rigid arm pendulum is a wind sock. Other wind drag structures may be used however including for example, a paddle, or an angle plate.

In another feature of the invention the sliding collar is formed with a relatively low friction contact inside liner surface for sliding along the center pole. For example, the low friction liner may be in the form of metal screening material. Other objects, features and advantages of the invention are apparent in the following specification and accompanying drawings.

BRIEF DESCRIPTION OF THE DRAWINGS

FIG. 1 is a diagrammatic side view of the wind speed and wind direction indicator according to the invention showing the slidably changing vector triangle during operation.

FIG. 2 is a fragmentary detailed exploded view in partial cross section of the top of the support pole or mast.

FIG. 3 is a side view in partial cross section of the sliding collar.

DESCRIPTION OF PREFERRED EXAMPLE EMBODIMENTS AND BEST MODE OF THE INVENTION

Figure 4:
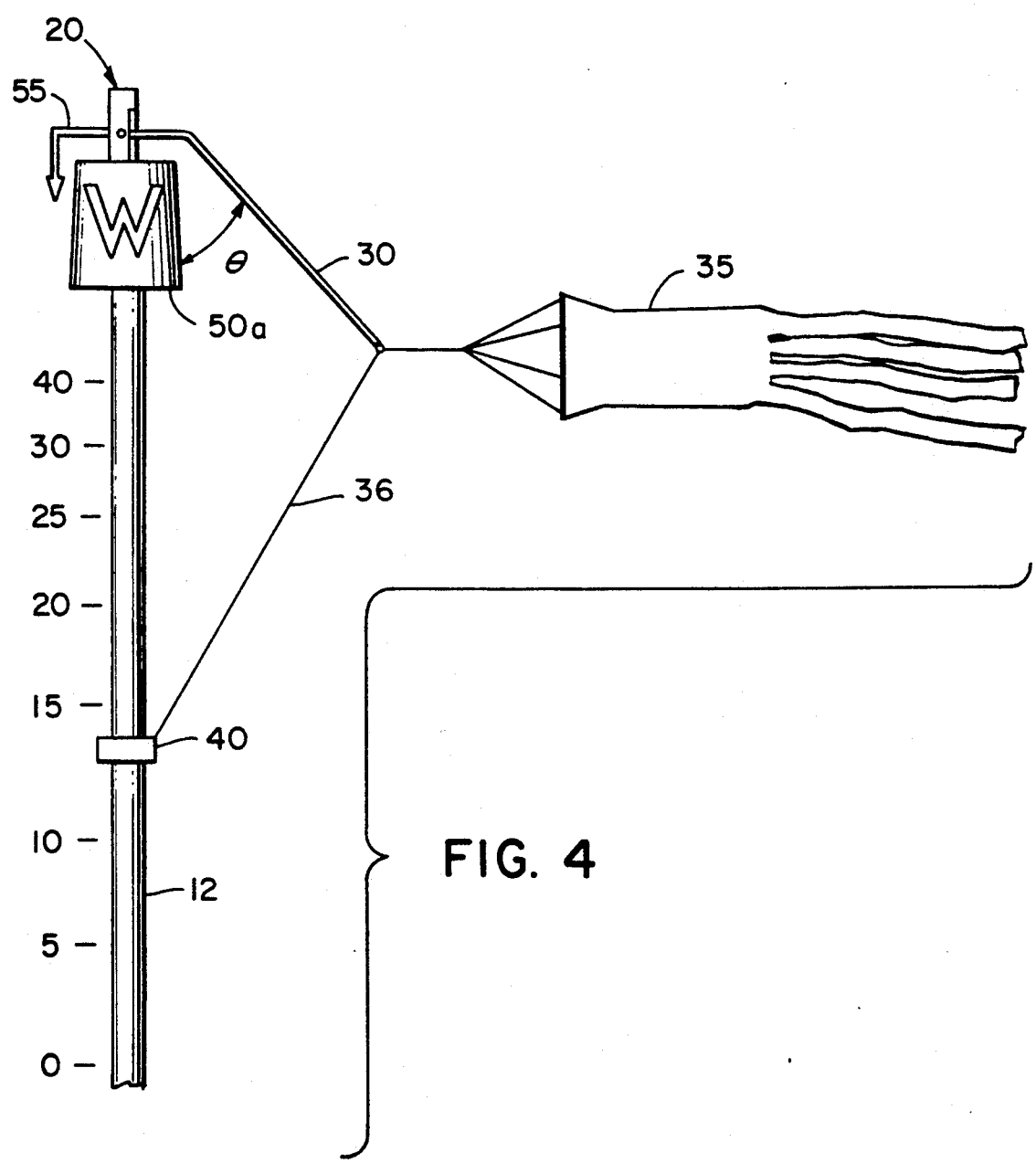
FIG. 4 is a fragmentary side view of the top portion of the support pole or mast of an alternative embodiment with a swivel head pointer mounted for rotation around a stationary compass sleeve.

The wind speed and wind direction indicator 10 is constructed with a center support pole or mast 12 having a length, for example 8' (2.5 m) in length which may be appropriately mounted and anchored on a building in vertical position or anchored in the ground by a 2' length 14. The support pole 12 is provided by lengths of 2" (5 cm) or greater diameter PVC pipe joined by 1½" (4 cm) or greater diameter pipe sections 15 in a friction fit. The mast 12 is formed with wind speed indicia forming a graduated scale in a linear direction easily readable on the mast 12 as illustrated in FIG. 1.

As illustrated in FIGS. 1 and 2 a swivel head 20 is inserted in the top of the support pole 12 for rotation to different directions of the compass. Inserts or cups 18 are secured for example by gluing or bonding in spaced apart positions at the top of the mast 12. The inserts 18 are formed with smaller diameter holes to receive and guide the smaller diameter downward extending pipe extension 22 from the swivel head 20. The inserts 18 in effect provide the bearings for rotation of the swivel head 20 with respect to the mast 12. The abutting surface 24 at the top of the narrow diameter pipe extension 22 rests on the top of the mast 12 or the top insert 18 for relatively low friction contact.

Rigid arm 30 is mounted on the swivel head 20 at a pivot axis 32 so that the rigid arm 30 is able to assume different angular positions with respect to the mast 12 and function as a rigid arm pendulum. At the same time the pendulum 30 is able to rotate around the mast 12 with the swivel head 22 to different compass directions.

The wind drag force for changing the angle of the rigid arm pendulum 30 with respect to the support pole 12 is provided by a wind sock 35 which changes the angle $\theta$ in proportion to wind speed and wind drag force. A force triangle or vector triangle is completed by flexible line 36 which is connected to a sliding collar 40 mounted for sliding motion in a vertical direction up and down on the mast 12 over the wind speed indicia.

As the wind speed varies, the drag force provided by wind sock 35 changes the configuration of the force triangle or vector triangle resolving the angular motion of the rigid arm pendulum 30 into linear translating motion of the sliding collar 40. The collar 40 is therefore used to provide the indicator of wind speed. The visually readable scale on the pole 12 is calibrated empirically according to the dimensions of the indicator device and the characteristics of the wind sock 35. It is apparent that for smaller angle $\theta$ the graduations on the wind speed scale and the translation of the collar 40 may be substantially proportional to the angle $\theta$. On the other hand at larger angles $\theta$ the magnitude of translation of the collar 40 bears a nonlinear functional relationship to the changing angle $\theta$, and the scale graduations are more closely spaced together in an apparent trigonometric type functional relationship. The visually readable wind speed scale on the pole 12 is actually positioned and inscribed according to empirical calibration for the particular components.

For smooth sliding motion of the collar 40 on pole 12, the collar 40 may be provided with a low friction contact inside surface 42 which slides easily on the pole 12. Such a low friction contact liner may be provided, for example, by a metal screening liner as illustrated in FIG. 3.

In the example of FIGS. 1-3, the wind direction indication is provided by a compass sleeve, cylinder or bucket 50 which is secured to the swivel head 20 by an appropriate fitting such as a threaded fitting. The compass sleeve 50 is formed with appropriate compass direction indicia 360° around the outside surface for indicating wind direction. In this example the center support pole 12 of the wind speed and wind direction indicator 10 is mounted at a fixed location relative to use or visual access from a single selected vantage point such as the window of a house or other building. The rotational position of the compass sleeve 50 relative to the swivel head and rigid arm pendulum arm 30 is set according to the perspective from the selected vantage point. Thus, in the example of FIG. 1, if the wind sock 35 is lifted by an east wind, that is a wind originating from the compass direction east, the compass sleeve 50 is loosened and turned so that the compass direction indicium E faces the selected vantage point. The compass sleeve or bucket 50 is then secured to the swivel head 20 for rotation with the swivel head. Upon rotation of the wind sock, pendulum 30 and swivel head 20 to different compass directions in response to changing wind direction, the compass sleeve 50 will always display the correct compass direction indicium for the direction of origin of the wind to a viewer at the selected vantage point.

In an alternative embodiment illustrated in FIG. 4, components performing substantially the same function as in the embodiments of FIGS. 1-3 are designated by the same reference numerals. In the alternative example of FIG. 4, however, the compass sleeve 50a is secured in fixed position to the stationary mast or support pole 12 rather than the rotating swivel head 20. The compass direction indicia on the compass sleeve 50a are oriented to coincide with the true compass directions and remain in that position fixed to the mast 12.

The rigid arm pendulum 30 is pivotally coupled to the swivel head 20 as in the previous example. However in addition, a wind direction pointer 55 is also connected to the swivel head 20 on the side opposite the rigid arm 30 approximately 180° from the rigid arm 30. The pointer 55 is preferably shaped to direct attention to the compass direction indicia on the compass sleeve 50a. This can be accomplished by a right angle bend in the pointer as illustrated in FIG. 4.

Upon rotation of the wind sock, rigid arm pendulum 30, and swivel head 20 in response to changing wind direction, the pointer also rotates and points to the correct compass direction indicium representing the direction of origin of the wind. An advantage of this alternative embodiment is that it may be viewed from any position around the indicator device rather than from a single selected vantage point while still displaying correct wind direction by way of the pointer. This embodiment of the invention is therefore applicable for use at public locations where viewers may pass on different sides.

It is noted that the force triangle or vector triangle formed by the components of the wind speed and wind direction indicator of FIGS. 1 and 4 is extendable and retractable in response to changing wind speed. The retracting force or restoring force is provided by gravity which biases the rigid arm pendulum 30 in a downward direction so that the sliding collar 40 drops to the bottom of the wind speed scale as the wind speed diminishes for relatively small angles. In the linear range of trigonometric type functional relationships, the restoring force of gravity is proportional to the angular displacement, and the linear translation along the wind speed scale is proportional to angular displacement. For larger angles the relationship becomes non-linear and the wind speed scale is calibrated accordingly. The invention therefore provides an entirely novel application of the pendulum law for resolving angular motion of a rigid arm pendulum into linear translation across a wind speed scale. While a wind sock 35 provides the wind drag force in the preferred example, other drag force structures may also be attached to the rigid arm pendulum 30, such as for example, a paddle, or angle plate. The invention is intended to include all such modifications and equivalents within the scope of the following claims.

I claim:

1. A wind speed and wind direction indicator comprising:
   a center support pole having a vertical scale of wind speed indicia for visually reading wind speed at a distance from the pole;
   a swivel head means mounted at the top of the pole for rotation of the swivel head means to different compass directions;
   a rigid arm having a free end and being pivotally coupled at the other end to the swivel head means for pivotal motion of the rigid arm to different angles with respect to the center support pole and for rotation of the rigid arm with the swivel head means on the center support pole;
   a wind drag means coupled to the free end of the rigid arm for changing the angle of the rigid arm relative to the support pole in response to varying wind speed and for rotation of the swivel head means to different compass directions in response to varying wind direction;
   a sliding collar mounted on the center support pole for sliding motion up and down over the scale of wind speed indicia for indicating wind speed;
   and a line coupled between the free end of the rigid arm and the sliding collar for sliding motion of the collar over the scale in response to varying wind speed.

2. The wind speed and wind direction indicator of claim 1 further comprising compass direction means mounted on the support pole in relation to the swivel head means and rigid arm, said compass direction means being formed with wind direction compass indicia around the support pole for visual reading at a distance from the pole.

3. The wind speed and wind direction indicator of claim 2 wherein the compass direction means is secured to the swivel head means for rotation with the rigid arm, and wherein the wind direction compass indicia on the compass direction means are set with respect to the rigid arm so that the rotational position of the wind direction compass indicium indicating the true compass direction of origin of the wind is visible and readable from a selected vantage point.

4. The wind speed and wind direction indicator of claim 3 wherein the compass direction means comprises a sleeve having a surface coaxial with the center support pole and secured to the swivel head means.

5. The wind speed and wind direction indicator of claim 2 wherein the compass direction means is secured to the support mast in stationary position and wherein the wind direction compass indicia on the compass direction means substantially coincide with true compass directions, and further comprising a wind direction pointer mounted on the swivel head means and extending from the swivel head means on the side opposite the rigid arm, said pointer pointing at the wind direction compass indicium indicating the true compass direction of origin of the wind.

6. The wind speed and wind direction indicator of claim 5 wherein the compass direction means comprises a generally cylindrical surface coaxial with the center support pole and mounted in stationary position to the support pole.

7. The wind speed and wind direction indicator of claim 1 wherein the wind drag means comprises a wind sock.

8. The wind speed and wind direction indicator of claim 1 wherein the sliding collar is formed with a relatively low friction contact inside liner for sliding along the center pole.

9. The wind speed and wind direction indicator of claim 8 wherein the low friction contact inside liner comprises metal screening.

10. A wind speed indicator comprising:
    a support pole having a vertical scale of wind speed indicia formed on the pole;
    a swivel head mounted at the top of the pole for rotation of the swivel head to different compass directions;
    a rigid arm having a free end and being pivotally coupled at the other end to the swivel head for pivotal motion of the rigid arm to different angles with respect to the support pole;

a wind drag means coupled to the free end of the rigid arm for changing the angle of the rigid arm relative to the support pole in response to varying wind speed;

a sliding collar mounted on the support pole for sliding motion up and down over the scale of wind speed indicia;

and a line coupled between the free end of the rigid arm and the sliding collar.

11. The wind speed indicator of claim 10 wherein the wind drag means comprises a wind sock.

12. A wind speed and wind direction indicator comprising:

a vertical mast having a vertical scale of wind speed indicia formed on the mast for visually reading wind speed information at a distance from the mast;

a swivel head means mounted at the top of the mast for rotation of the swivel head means to different compass directions;

a rigid arm pendulum having a free end and being pivotally coupled at the other end to the swivel head means for pivotal motion of the pendulum to different angles with respect to the mast;

a wind drag means coupled to the free end of the pendulum for changing the angle of the pendulum relative to the mast in response to varying wind speed and for rotation of the swivel head means to different compass directions in response to varying wind direction;

a sliding collar mounted on the mast for sliding motion up and down over the scale of wind speed indicia for indicating wind speed;

a line coupled between the free end of the rigid arm pendulum and the sliding collar for sliding motion of the collar over the scale in response to varying wind speed;

compass direction means mounted on the mast in relation to the swivel head means and pendulum, said compass direction means being formed with wind direction compass indicia around the mast for visual reading at a distance from the mast, said compass direction means being secured to the swivel head means for rotation with the pendulum, said wind direction compass indicia on the compass direction means being set with respect to the pendulum so that the rotational position of the wind direction compass indicium indicating the true compass direction of origin of the wind is visible and readable from a selected vantage point.

13. The wind speed and wind direction indicator of claim 12 wherein the compass direction means comprises a generally cylindrical sleeve having a surface coaxial with the mast and secured to the swivel head means.

14. The wind speed and wind direction indicator of claim 12 wherein the wind drag means comprises a wind sock.

* * * * *